United States Patent Office 3,449,798
Patented June 17, 1969

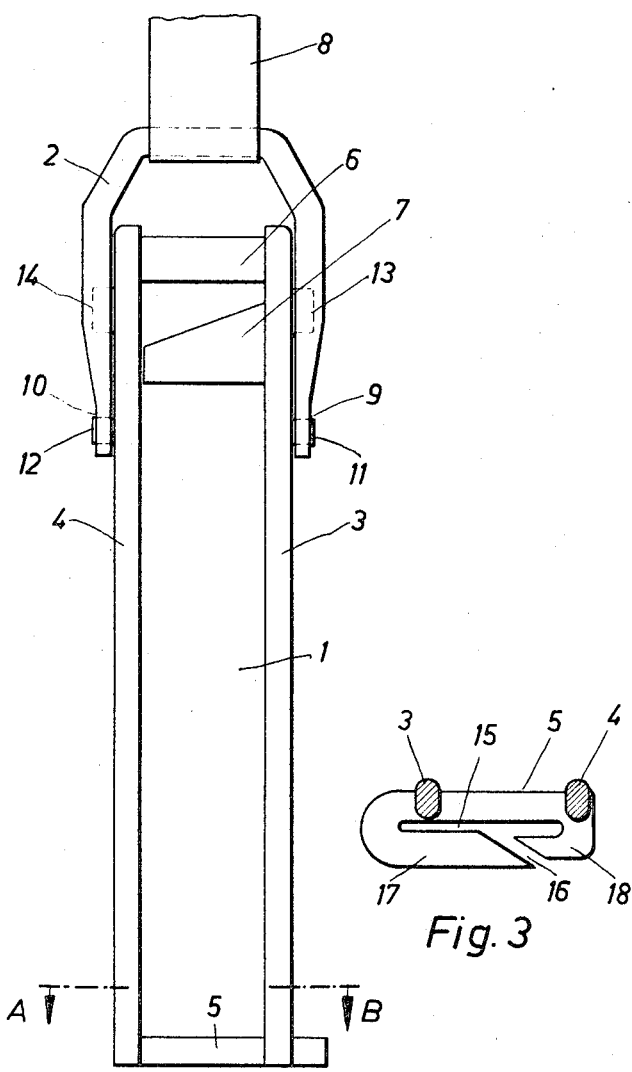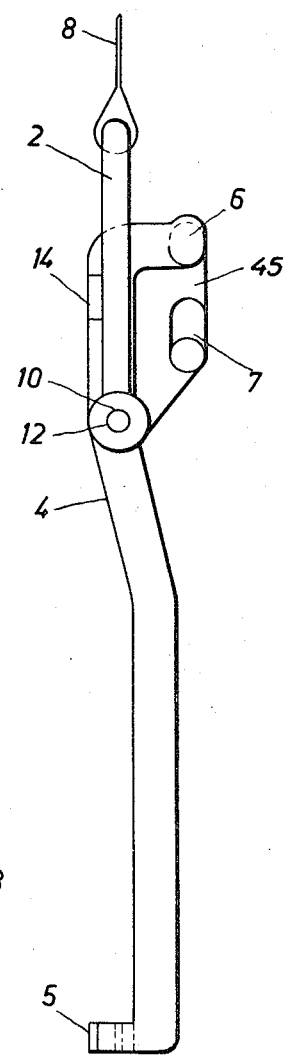
Fig. 1    Fig. 3    Fig. 2

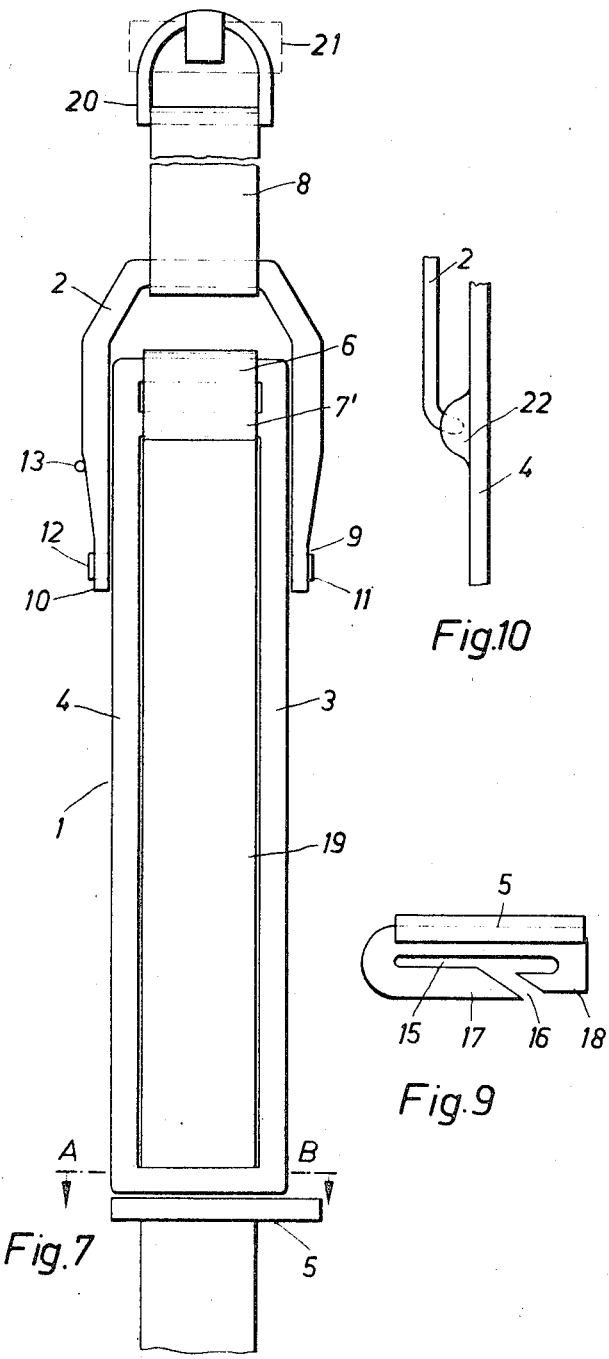
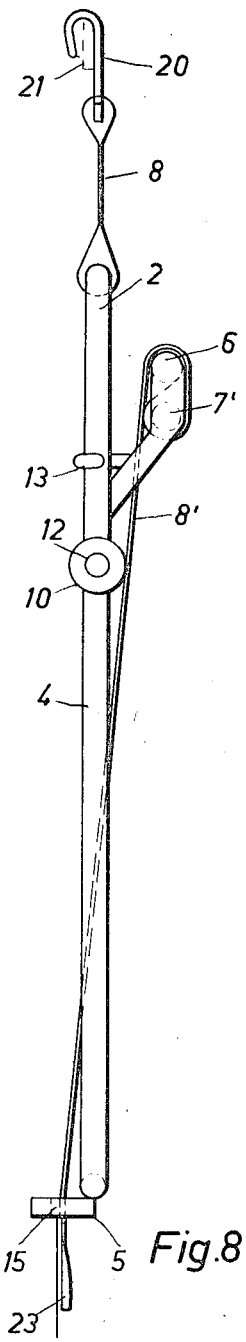
Fig. 10
Fig. 9
Fig. 7
Fig. 8
Inventor:
LUDWIG HOFMANN

3,449,798
TENSIONING AND SECURING DEVICE FOR LOAD SECURING STRAPS
Ludwig Hofmann, 10 Markgrafenstrasse, 758 Buhl, Baden, Germany
Filed May 31, 1967, Ser. No. 642,400
Claims priority, application Germany, June 4, 1966, H 59,601; Aug. 11, 1966, H 60,213
Int. Cl. B63d 63/16
U.S. Cl. 24—71     6 Claims

ABSTRACT OF THE DISCLOSURE

Two side members are curved upwards at one end and are joined at this end by a clamping pin and a clamping rib. At their other end, a safety frame is mounted. A strap is connected to a strap yoke pivoted on the side members. The other end of the strap is passed around a container and finally looped around the clamping rib. Manual rotation of the two side members locks and tensions the straps. The safety frame is then pushed onto the strap and thus holds the strap locked and in tension.

---

The invention concerns a tensioning and securing device for load securing straps of all kinds.

To secure various kinds of goods shipping containers it is customary for them to be strapped down on pallets or onto the frame of the transporting means itself, e.g., in a ship, railway car or truck. For this purpose straps and plastics bands are known which are particularly suitable for this object if they are fitted with a manually operated quick-release closure which also tensions the strap.

Tension hooks for securing a tension band with or without an eyelet are already known, and consist of a straight section acting as a lever adjoining which is a double U-shaped crank. To secure a load, the tensioning strap with eyelet is hooked into a bent portion of the hook, and the other end of the strap, after looping around the article to be secured, is hooked into the other bent portion. To tension the strap the lever is then swung about 180° and a crosspiece is slipped beneath the tensioned strap.

This known tensioning hook however has the disadvantage that the entire strap tension acts to lift the lever arm, so that it is retained in the tensioned state only by means of the crosspiece which is slid beneath the band section. Inexpert opening causes the lever arm to swing back suddenly, risking injuries to the hands of the operation. Furthermore the known tensioning hook also has a further disadvantage that it does not positively prevent the strap and hook from coming undone.

The present invention has as an object to provide a tensioning device for load securing bands of all kinds which has none of the disadvantages stated above and which, in a closed state, is free of any tendency to undo itself. The problem posed is solved in accordance with the invention by a tensioning device for load securing straps by the fact that a device for tensioning and closing a load securing strap, a strap yoke, is pivotally connected to one end of a frame carrying the hand lever.

In a specific embodiment of a tensioning device in accordance with the invention, the hand lever consists of two upwardly curving sides which at one end are interconnected via a clamping pin and at the other end via a safety frame with a tapered clamping rib protruding from one side, level with the clamping pin.

The strap yoke is U-shaped and preferably made of spring steel with two eyelets formed in its limbs by means of which it is mounted on two studs which are located below the clamping pin or the clamping rib one on each side member, in such a manner that a loop of the free strap section formed after rotating the hand yoke over the strap yoke is adapted to be slipped over the strap yoke and the clamping rib. When the hand lever is returned to a closed postion, the strap tension holds it in this postiion.

Figure 4:
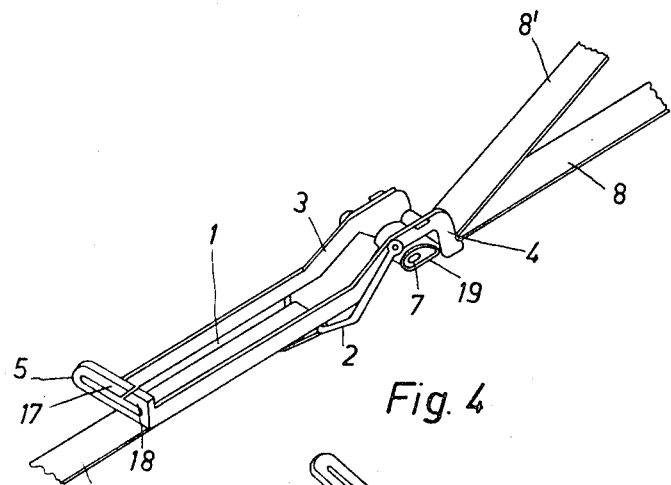
Figure 5:
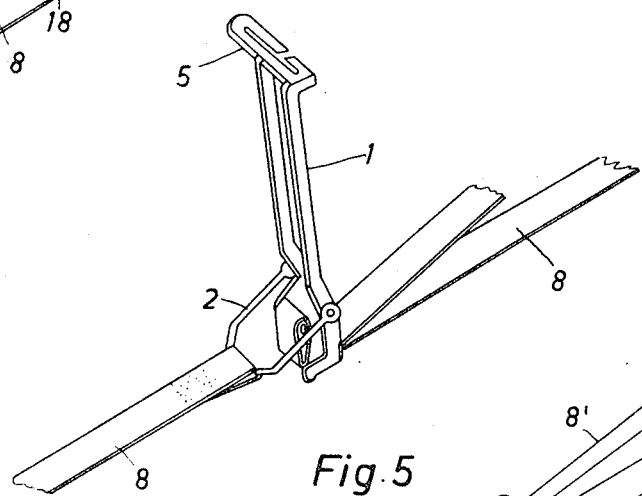
Figure 6:
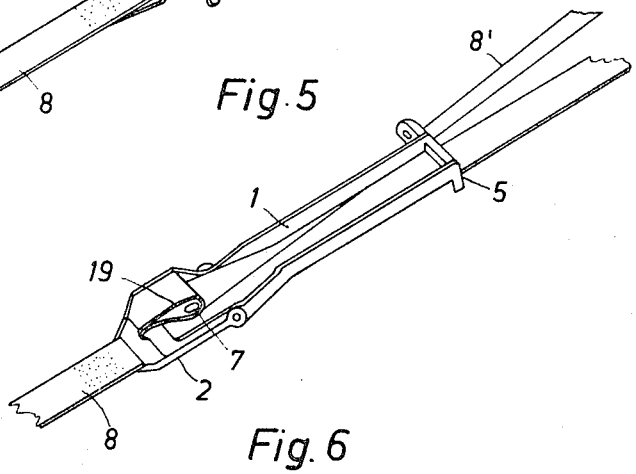
Figure 11:
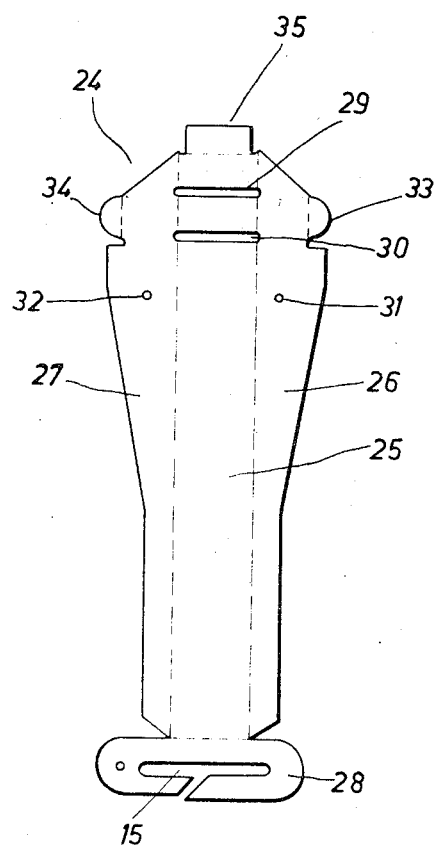
Figure 12:
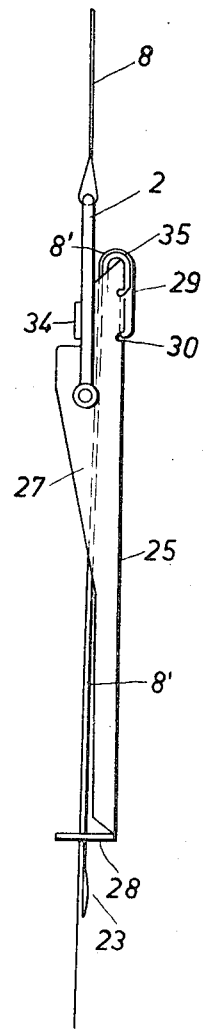

The subject matter of the invention is described in detail by way of various embodiments as illustrated in the accompanying drawings in which:

FIG. 1 is a plan view, and
FIG. 2 is a side view of a tensioning device of the invention.
FIG. 3 shows a section A–B of FIG. 1.
FIGS. 4, 5 and 6 show in perspective the use of the tensioning device of the invention in three positions.
FIGS. 7, 8, 9 and 10 show another embodiment of the invention.
FIGS. 11 and 12 show another embodiment of the invention.

In FIGS. 1 and 2 a tensioning device of the invention consists of a hand lever denoted by the numeral 1, to which a strap yoke 2 is pivotally connected. The hand lever 1 is made up of two side members 3 and 4 which are interconnected by means of a safety frame 5 at one end. At the other end the sides 3, 4 extend upwardly in a curve and are interconnected by means of a fixed clamping pin 6. This provides a rigid frame-shaped hand lever.

The side 4 is recessed at the upper end, and the side 3 has a reinforced section 45 which has a conical clamping rib 7 projecting therefrom at the level of the pin 6. The clamping rib 7 is tapered to permit a loop of a securing strap to be inserted, and to even the bending stresses. For reasons of strength the pin 6 is cleated over at both ends.

The strap yoke 2 consists of spring steel and is bent into a U-shape. At the upper end a load securing band 8 is attached by looping and stitching, and/or cementing the looped-over end. The strap yoke has eyelets 9, 10 on its limbs which are pivotally mounted on two studs 11, 12. If required, the studs may be provided with bushes.

At the upper end of the sides 3, 4, two lugs 13, 14 act as stops for the strap yoke 2. The object of the lugs is to prevent the hand lever from being turned over to the wrong side. They also prevent any reverse pivot movement of the tensioned hand lever with the safety frame 5.

In the embodiment shown, the safety frame 5 extends at right angles to the sides 3, 4 and is firmly connected thereto. The safety frame is asymmetrically arranged relative to the two sides 3, 4 and, as shown is FIG. 3, has a longitudinal slot 15 adapted to receive a loop-around part of the strap. The safety frame 5 also has a cut 16 extending diagonally into a longitudinal slot 15, forming two tongues 17 and 18. The arrangement is such that the upper surface of the large tongue corresponds substantially to the width of the tensioning band to ensure satisfactory release. The large tongue 17 projects downwardly to enable the strap to be engaged. The small tongue 18 is displaced relative to the upper portion of the large tongue 17 to prevent the securing strap from becoming accidentally unhooked through the inclined slot 16 due to vibrations. The operation of the tensioning device in accordance with the invention is explained in detail by reference to FIGS. 4–6.

As shown by FIG. 4, the hand lever 1 is first hinged back via the strap yoke 2. Then the end of the securing strap 8, looped around an article, not shown, is formed into a loop 19 which is slipped onto the clamping rib 7. Subsequently simply by pulling at the end 8′ of the securing strap 8 a certain pre-tension is imparted. The part 5 of the side 3 prevents the strap from slipping off sideways.

As shown in FIG. 5, the hand lever 1 is now rotated into its tensioning position by the strap yoke 2, causing the securing strap 8 is to be further tensioned. The lengths of the securing strap are so wound around and pressed on each other as to provide an absolutely firm hold on the band. When the tension device is being applied, the pin 6 moves through the strap yoke and thus applies extra tension and the side 4 prevents the securing strap from slipping off.

In the final position, as shown in FIG. 6, the securing strap 8 extends from the pin 6 to the safety frame 5. The hand lever with its safety frame 5 is supported on the tensioned strap under the effect of the torque acting in a direction to hold the frame 5 onto the strip. The reason for this is that the securing strap extends from the pin 6 to the securing frame above the pin centre, so that the hand lever remains in its closed position even if the strap loop is subject to considerable pre-stressing. The securing frame is supported on the tensioned strap to resist the pressure of the hnd lever.

Subsequently the hand lever is moved slightly to the side and then back again. At this time the projecting edge of the large tongue 17 of the safety frame engages the strap automatically from the side and leads it into the longitudinal slot 15 via the inclined slot 16. If during transit vibration should cause the strap to be laterally displaced in the longitudinal slot 15, it cannot be accidentally unhooked from the slot because the upper side of the small tongue 18 is lower than the upper side of the large tongue 17. The strap 8 is thus able to slip over the inclined slot 16.

To release the hand lever 1, it is first moved to the side till the strap 8 is at the end of the safety slot 15. Then the opposite side of the strap is tilted in the direction of the inclined slot by suitable finger pressure and simultaneously the hand lever is moved sidewise, whereupon the strap leaves the safety frame. Subsequently the hand lever is tilted back through the strap yoke 2, causing the whole strap to be slackened and automatically releasing the clamping. The strap may then be removed from the pin 6.

The tensioning device of the invention has the advantage relative to known bracing tensioning means that the hand lever cannot accidentally fly open even if the safety frame is not engaged. This frame provides a perfectly safe closure.

FIGURES 7, 8 and 9 show a further embodiment of a tensioning device in accordance with the invention. According to this embodiment two side rods 3, 4 on the surface are connected at one end by two strips 6 and 7' which, may be integrally formed from the two rods 3, 4 or welded or riveted thereon. As shown especially in FIGURE 8, the rods 3, 4 are so bent upwardly at an angle towards the pivot of the strap yoke 2 that the two strips 6, 7' lie higher than the pivot 12.

In the example shown the strap 8 is in two parts and at the upper end has a stirrup-shaped hook 20 which is hooked in a pallet. To prevent the hook 20 from becoming detached when the strap is slackened, clamping means 21 may be provided which, may comprise a flat magnet, a spring, a rubber cap or the like. The safety frame 5 in the example shown, extends at right angles to the rods 3, 4 and is connected thereto, by spot welding or is formed integrally therewith.

As shown in FIG. 10, the strap yoke 2 may be hinged in lugs 22 which are located on the rods 3, 4.

As shown in FIGURES 7 and 8, after the hand lever 1 has been reversed the strap end 8' is looped around the rib 7' and extends over the pin 6 and through the slot 15 of the safety frame 5. The end of the strap 8' as shown at 23, may have a thickened portion to prevent it from slipping between the two pin 6, 7'. The other end of the securing strap 8' like the securing strap 8, has a latching hook with a clamping device which is hooked into position on the other side of the pallet. Tensioning of the strap sections takes place in a similar manner to that described in connection with FIGURES 4 to 6.

FIGURES 11 and 12 show a further embodiment of a tensioning device of the invention. The hand lever comprises a form generally designated by 24, which is obtainable by punching from sheet metal. The form 24 has a central face 25 and two sides 26 and 27. To form the hand lever, the two sides 26 and 27 are bent downwardly on the vertical dotted lines, through 90°. At the lower end of the form 24 there is a metal frame 28 integrally connected thereto, which is formed as the safety frame 5 shown in FIG. 3 and which is bent over as the side sections 26 and 27, to receive the strap end 8'.

The central face 25 has two slot-shaped apertures 29 and 30 formed therein and extending at right angles to the long dimension of the face to form enveloping ribs for the securing strap 8'.

Two holes 31 and 32 are formed in the side sections 26 and 27 which, as shown in FIG. 12, serve to receive pins on the ends of the strap yoke 2 for the securing thereof. The side sections also have tabs 33 and 34 which are bent outwards and are provided to act as stops for the strap yoke 2.

On the first rib above the aperture 29 a further metal tab 35 is provided which, as shown in FIG. 12, is bent over, to prevent the securing strap 8' from being damaged by a sharp edge. This bent-over tab 35 strengthens the front rib.

As shown in FIG. 12, the securing strap 8' with its loop is inserted through both apertures 29 and 30 and is located in the longitudinal slot 15 of the frame 28 acting as safety means. The tensioning device is closed in the same manner as in the embodiment shown in FIGS. 4–6. The embodiment shown in FIGS. 11 and 12 has the additional advantage that it is easier to product and at lower cost, since in practice only punching and bending operations are required for manufacture.

What I claim is:

1. A tensioning device for securing a strap, comprising a hand lever with a means for tensioning and closing the strap, said means including a strap yoke for connection to one end of the strap, said strap yoke being pivotally connected to the hand lever; said hand lever comprising two side members curved upwards at one end and interconnected at said one end by a clamping pin and at the other end by a safety frame, and a tapered clamping rib projecting from one of said members substantially at the level of said pin.

2. A tensioning device according to claim 1, said strap yoke being U-shaped and made of spring steel and mounted on two pins by means of eyelets provided on its shanks, the said two pins being located beneath said strap clamping pin and behind said clamping rib, whereby, when a free end of the strap is threaded with a loop around the clamping rib and the hand lever is rotated over the strap yoke, the strap is tensioned onto the clamping rib and the clamping pin, such that the tension in the strap presses the hand lever onto the strap.

3. A tensioning device according to claim 1, further comprising means on the underside of both side members to act as a stop for the strap yoke.

4. A tensioning device according to claim 1 further comprising a safety frame extending at right angles to the side members and parallel to the clamping pin and asymmetrically to the strap yoke, which safety frame has a longitudinal slot into which an asymmetric diagonal slot extends, a large tongue formed thereby corresponding substantially to the width of the strap with its upper and lower edges projecting beyond the corresponding edges of a smaller tongue.

5. A tensioning device for securing a strap, comprising a hand lever with a means for tensioning and closing the strap, said means including a strap yoke for connection to one end of the strap, said strap yoke being pivotally connected to the hand lever, the hand lever comprising a sheet metal member (24) having a central face (25) and U-shaped side members (26, 27) with the strap yoke mounted rotatably on the side members, the central face (25) of the member (24) provided at one end with two slot-shaped apertures (29, 30) running perpendicularly above the pivot of the strap yoke (2) thus forming enveloping ribs for a securing strap (8), the other end of the member (24) integrally incorporating a bent-over metal tab (28) forming a securing frame.

6. A tensioning device according to claim 5, in which the enveloping rib continuing from a first (29) of said slot-shaped apertures is extended by a rounded metal tab (35, both side portions (26, 27) being provided at the height of the strap yoke with two stop tabs (33, 34) bent outwards.

References Cited
UNITED STATES PATENTS

| | | | |
|---|---|---|---|
| 179,872 | 7/1876 | Seymour. | |
| 373,017 | 11/1887 | Frost | 24—273 |
| 533,547 | 2/1895 | Moore | 24—273 |
| 872,969 | 12/1907 | Patterson et al. | 24—273 |
| 899,997 | 9/1908 | Mark | 24—71 |
| 2,390,232 | 12/1945 | Venditty | 24—71 |
| 2,852,827 | 9/1958 | Arnold | 24—273 |

FOREIGN PATENTS 113,007  1/1945  Sweden.

DONALD A. GRIFFIN, *Primary Examiner.*

U.S. Cl. X.R.

24—273